United States Patent
Ushiba et al.

(10) Patent No.: US 10,176,720 B2
(45) Date of Patent: Jan. 8, 2019

(54) AUTO DRIVING CONTROL SYSTEM

(71) Applicant: HITACHI, LTD., Tokyo (JP)

(72) Inventors: Hiroyuki Ushiba, Tokyo (JP); Mariko Okude, Tokyo (JP); Takehisa Nishida, Tokyo (JP)

(73) Assignee: HITACHI, LTD., Tokyo (JP)

( * ) Notice: Subject to any disclaimer, the term of this patent is extended or adjusted under 35 U.S.C. 154(b) by 84 days.

(21) Appl. No.: 15/443,793

(22) Filed: Feb. 27, 2017

(65) Prior Publication Data

US 2017/0270798 A1 Sep. 21, 2017

(30) Foreign Application Priority Data

Mar. 17, 2016 (JP) .................................. 2016-053210

(51) Int. Cl.
*G08G 1/16* (2006.01)
*B60W 30/16* (2012.01)
(Continued)

(52) U.S. Cl.
CPC ............. *G08G 1/166* (2013.01); *B60W 30/16* (2013.01); *B60W 50/029* (2013.01);
(Continued)

(58) Field of Classification Search
CPC .... B60W 30/16; B60W 50/029; B60W 50/14; G08G 1/161; G08G 1/166
(Continued)

(56) References Cited

U.S. PATENT DOCUMENTS

| | | | |
|---|---|---|---|
| 2008/0167820 A1* | 7/2008 | Oguchi | B60W 40/09 701/301 |
| 2009/0062987 A1* | 3/2009 | Kim | B60W 30/09 701/41 |

(Continued)

FOREIGN PATENT DOCUMENTS

| | | |
|---|---|---|
| DE | 19944556 A1 | 3/2001 |
| DE | 102014210147 A1 | 12/2015 |
| EP | 2921362 A1 | 9/2015 |
| JP | 2008-049888 A | 3/2008 |
| JP | 2009-061943 A | 3/2009 |
| JP | 2014-181020 A | 9/2014 |
| JP | 2015-032291 A | 2/2015 |
| JP | 2015-063244 A | 4/2015 |

OTHER PUBLICATIONS

Extended European Search Report for Application No. 17159066.4 dated Jul. 24, 2017.

*Primary Examiner* — Thomas G Black
*Assistant Examiner* — Luat T Huynh
(74) *Attorney, Agent, or Firm* — Volpe and Koenig, P.C.

(57) ABSTRACT

An auto driving control system includes: a situation determining unit which recognizes a situation around the vehicle and determines whether automatic traveling is possible; a drive control unit which performs traveling control when the automatic traveling is possible; a state determining unit which determines whether an occupant is able to drive; and an estimation drive control unit configured such that when the automatic traveling is difficult and it is difficult for the occupant to take over the driving, and when it is determined that execution of a function of the automatic traveling is difficult due to a first sensor, the estimation drive control unit executes the function by using information of a second sensor, and performs traveling control of the vehicle, wherein the automatic traveling is continued based on a control instruction of the estimation drive control unit until the occupant becomes able to take over the driving.

17 Claims, 5 Drawing Sheets

(51) Int. Cl.
*B60W 50/14* (2012.01)
*B60W 50/029* (2012.01)
*B60W 40/08* (2012.01)
*B60W 50/00* (2006.01)
*B60W 50/02* (2012.01)

(52) U.S. Cl.
CPC ............ *B60W 50/14* (2013.01); *G08G 1/161* (2013.01); *B60W 2040/0818* (2013.01); *B60W 2050/0072* (2013.01); *B60W 2050/0215* (2013.01); *B60W 2420/40* (2013.01); *B60W 2420/42* (2013.01); *B60W 2420/52* (2013.01); *B60W 2540/22* (2013.01); *B60W 2540/26* (2013.01); *B60W 2550/10* (2013.01); *B60W 2750/308* (2013.01); *B60W 2750/40* (2013.01)

(58) Field of Classification Search
USPC ................. 701/41, 48, 70, 96, 117
See application file for complete search history.

(56) References Cited

U.S. PATENT DOCUMENTS

| | | | |
|---|---|---|---|
| 2013/0024084 A1 | 1/2013 | Yamashiro | |
| 2013/0231829 A1* | 9/2013 | Gerdt | G05D 1/0061 |
| | | | 701/41 |
| 2014/0067206 A1* | 3/2014 | Pflug | B60W 10/04 |
| | | | 701/41 |
| 2014/0195120 A1* | 7/2014 | McClain | G08G 1/16 |
| | | | 701/41 |
| 2015/0094899 A1 | 4/2015 | Hackenburg et al. | |
| 2015/0120124 A1 | 4/2015 | Bartels et al. | |
| 2015/0183410 A1* | 7/2015 | Ko | B60T 8/174 |
| | | | 701/96 |
| 2016/0260328 A1* | 9/2016 | Mishra | G08G 1/163 |
| 2018/0017969 A1* | 1/2018 | Nagy | B60W 50/082 |

* cited by examiner

FIG. 4

| | CONFIGURATION A | CONFIGURATION B | CONFIGURATION C | CONFIGURATION D | CONFIGURATION E | CONFIGURATION F | ... |
|---|---|---|---|---|---|---|---|
| SINGLE LENS CAMERA | ○ | ○ | ○ | | | | |
| STEREOSCOPIC CAMERA | | | | ○ | ○ | ○ | |
| INFRARED CAMERA | | | ○ | ○ | | | |
| OMNIDIRECTIONAL CAMERA | | ○ | | | | ○ | |
| MILLIMETER WAVE RADAR (INCLUDING SUBMILLIMETER WAVE) | ○ | ○ | ○ | | | | |
| LASER RADAR | ○ | | | | ○ | | |
| NIGHT VISION | | ○ | | ○ | ○ | ○ | |
| ULTRASONIC WAVE | ○ | | | | ○ | | |
| REAR (BACK) CAMERA | — | — | — | — | — | — | — |
| MAP & GPS | — | — | — | — | — | — | — |
| COMMUNICATION INFORMATION (VEHICLE-TO-VEHICLE, ROAD-TO-VEHICLE COMMUNICATION, ETC.) | — | — | — | — | — | — | — |

FIG. 5

| | DETECTION DISTANCE | DISTANCE MEASUREMENT | RECOGNITION | NIGHT |
|---|---|---|---|---|
| SINGLE LENS CAMERA | ○ | △ | ◎ | × |
| STEREOSCOPIC CAMERA | ○ | ○ | ◎ | × |
| INFRARED CAMERA | △ | ○ | × | ○ |
| OMNIDIRECTIONAL CAMERA | × | × | △ | × |
| MILLIMETER WAVE RADAR (INCLUDING SUBMILLIMETER WAVE) | ◎ | ◎ | × | ◎ |
| LASER RADAR | × | △ | × | ◎ |
| NIGHT VISION | ○ | ○ | × | ◎ |
| ULTRASONIC WAVE | × | × | × | ◎ |
| REAR (BACK) CAMERA | △ | × | △ | × |
| MAP & GPS | — | — | — | ◎ |
| COMMUNICATION INFORMATION (VEHICLE-TO-VEHICLE, ROAD-TO-VEHICLE COMMUNICATION, ETC.) | — | — | — | ◎ |

# AUTO DRIVING CONTROL SYSTEM

BACKGROUND OF THE INVENTION

1. Field of the Invention

The present invention relates to an auto driving control system for vehicles, and, in particular, relates to an auto driving control system capable of supporting automatic traveling safely even when abnormalities occur on sensors supporting automatic traveling of a vehicle.

2. Description of the Related Art

In a conventional auto driving control system for vehicles, when automatic traveling is able to be performed, the automatic traveling is executed continuously. However, the auto driving control system is configured to, when it is determined that the automatic traveling is not able to be performed, notify an occupant of the determination result.

For example, in JP-2008-49888-A, in accordance with the determination result as to whether automatic traveling is able to be performed in terms of a distance between the vehicle and another vehicle and the like, an occupant is notified of the propriety of the automatic traveling. In concrete terms, determination conditions have been set previously for the respective determination items, such as a situation in the vicinity of two or more types of vehicles, a history of dangerous drive operations, and a traveling distance after starting automatic control. Then, ACC and an ECU determine, based on the determination conditions, whether automatic control (so-called, ACC control) can be executed in the traveling state of a vehicle (i.e., a traveling speed and a distance between the vehicle and a preceding vehicle). Successively, in the case where it has been determined that the ACC control can be executed, a message showing the determination result is displayed on a display. Furthermore, when a driver inputs a start instruction of the ACC control via an ACC switch in response to the displayed message, the vehicle is controlled to be in a prescribed traveling state.

Furthermore, according to JP-2015-32291-A, in accordance with the state of a driver, the notification level is changed. In this case, an automatic travel support device includes a support control unit 11, a support determining unit 12, a state determining unit 13, a notification control unit 15, and a notification output unit 25. Furthermore, the above units are configured as follows. The support control unit 11 controls automatic travel support for a vehicle. The support determining unit 12 determines whether the automatic travel support can be continued. The state determining unit 13 determines whether a driver of the vehicle is able to drive normally. The notification output unit 25 issues a warning with regard to the automatic travel support in accordance with the determination result of each of the support determining unit 12 and the state determining unit 13. In the case where it is determined that the automatic travel support cannot be continued and it is determined that the driver is unable to drive normally, the notification control unit 15 makes the level of warning higher than that in the case where it is determined that the automatic travel support can be continued and it is determined that the driver is unable to drive normally, or in the case where it is determined that the automatic travel support cannot be continued and it is determined that the driver is able to drive normally.

However, even in the case of performing any kind of notification, these conventional techniques assume that a driver is able to drive.

For this reason, even in the traveling with an automation level of 3 or more which is defined by Ministry of Land, Infrastructure and Transport and National Highway Traffic Safety Administration, an occupant required to keep a state of being able to drive regardless of the condition that a driver is allowed to respond only at the time of emergency at the automation level of 3 or more.

The reason is that, for example, in the case where automatic driving with an automation level of 3 or more becomes impossible due to failure of sensors or a change of the weather, in the current system, the control of a vehicle is returned to an occupant immediately.

Furthermore, similarly, also in traveling with an automation level of 2, in the case where the usual automatic traveling becomes impossible, the control of a vehicle is returned to an occupant immediately. However, since it is difficult to assume the situation recognition of the occupant without making mistakes, it is hard to say that the driving is taken over safely. For example, in the case of poor visibility under the bad weather, it may be difficult for a human to drive. There may be also a case where an occupant cannot take over driving safely due to sudden illness and the like.

Furthermore, as a countermeasure in the case where automatic traveling becomes impossible, decelerating and stopping may be considered. However, on a highway, a street intersection, a railroad crossing, or a curved road with low visibility, the control for decelerating and stopping may not be safe.

For this reason, at the time of automatic traveling, even in the case where continuation of the automatic traveling becomes difficult, it is necessary to take over the driving to an occupant with a time allowance in response to the state of the occupant.

SUMMARY OF THE INVENTION

From the above matters, an object of the present invention is to provide an auto driving control system which enables driving to be continued safely even in the case where it is determined that continuation of automatic driving is difficult due to defects of sensors.

To achieve the above object, an auto driving control system realizes automatic traveling of a vehicle with a combination of a plurality of functions, each of which uses information from at least one of a plurality of sensors mounted on the vehicle, and the auto driving control system includes: a situation determining unit which recognizes a situation around the vehicle during traveling by using an external sensor to detect a situation outside the vehicle among the sensors and determines whether automatic traveling is possible; a drive control unit which performs traveling control for the vehicle in a case where the automatic traveling is possible; a state determining unit which determines whether an occupant is able to drive, based on a state of the occupant by using an in-vehicle sensor to detect a situation inside the vehicle among the sensors; and an estimation drive control unit configured such that in a case where the automatic traveling is difficult and it is difficult for the occupant to take over the driving, and in a case where it is determined that execution of a function of the automatic traveling is difficult due to a first sensor to supply information to the function, the estimation drive control unit executes the function in a substitution manner by using information of a second sensor other than the first sensor, and performs traveling control of the vehicle, wherein the automatic traveling is continued based on a control instruction of the estimation drive control unit until the occupant becomes able to take over the driving.

Furthermore, in the present invention, an auto driving control method realizes automatic traveling of a vehicle with a combination of a plurality of functions, each of which uses information from at least one of a plurality of sensors mounted on the vehicle, and the auto driving control method includes: determining whether automatic traveling is possible, by recognizing a situation around the vehicle during traveling by using an external sensor to detect a situation outside the vehicle among the sensors; performing traveling control for the vehicle in a case where the automatic traveling is possible; determining whether an occupant is able to drive, based on a state of the occupant by using an in-vehicle sensor to detect a situation inside the vehicle among the sensors; in a case where the automatic traveling is difficult and it is difficult for the occupant to take over the driving, and in a case where it is determined that execution of a function of the automatic traveling is difficult due to a first sensor to supply information to the function, performing traveling control for the vehicle by executing the function in a substitution manner by using information of a second sensor other than the first sensor; and continuing the automatic traveling based on an instruction of traveling control for the vehicle until the occupant becomes able to take over the driving.

Furthermore, in the present invention, an auto driving control method realizes automatic traveling of a vehicle with a combination of a plurality of functions, each of which uses information from at least one of a plurality of sensors disposed inside and outside the vehicle, and the auto driving control method includes: performing automatic traveling by using an external sensor to detect a situation outside the vehicle; determining whether an occupant is able to drive, by using an in-vehicle sensor to detect a situation inside the vehicle; and in a case where the automatic traveling is difficult and it is difficult for the occupant to take over the driving, performing traveling control for the vehicle with a substitution function by using information of a second sensor in place of a first sensor being a cause of making the automatic traveling difficult; and continuing traveling control for the vehicle with the substituent function until the occupant becomes able to take over the driving.

According to the above-mentioned configuration, it becomes possible to take over driving safely to an occupant.

BRIEF DESCRIPTION OF THE DRAWINGS

FIG. 4 is a diagram showing a configuration example of sensors required for automatic driving and various functions of the automatic driving with a combination of these sensors; and FIG. 5 is a diagram representing performance of sensors in a simplified manner.

DESCRIPTION OF THE PREFERRED EMBODIMENTS

Hereinafter, an embodiment of the present invention will be described with reference to the drawings.

Figure 2:
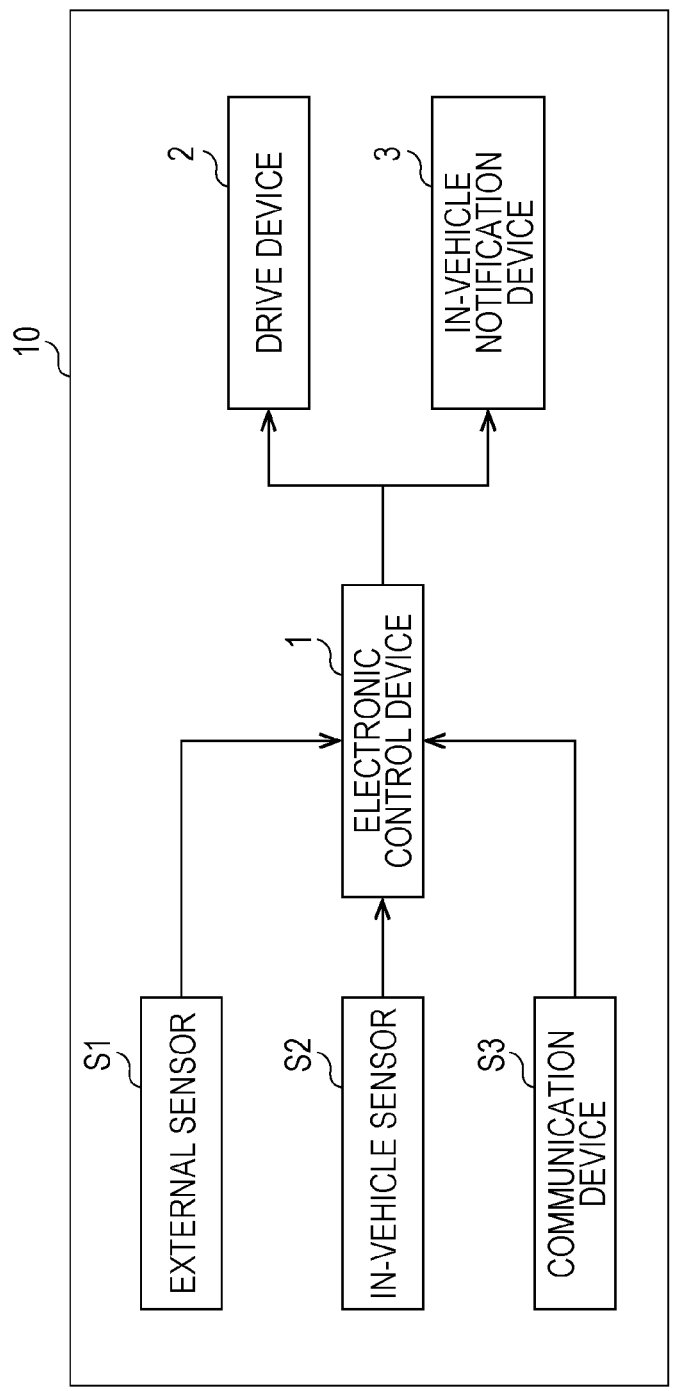
FIG. 2 is a diagram showing a schematic configuration of a general auto driving control system mounted on a vehicle.

FIG. 2 is a diagram showing a schematic configuration of a general auto driving control system mounted on a vehicle. The auto driving control system 10 shown in FIG. 2 includes an external sensor S1, an in-vehicle sensor S2, a communication device S3, an electronic control device 1, a drive device 2, an in-vehicle notification device 3, etc. which are mounted on the vehicle. Among these components, the external sensor S1, the in-vehicle sensor S2, and the communication device S3 are various kinds of input devices for the electronic control device 1, and the drive device 2 and the in-vehicle notification device 3 are categorized as various kinds of output devices.

Furthermore, among these components, the external sensor S1 is a general term for sensors which output observation information outside a vehicle, such as a camera, a millimeter wave radar, a short-distance infrared sensor, a vehicle exterior temperature sensor, a vehicle exterior luminosity sensor, a speedometer, an accelerometer, and a device to measure a moving direction.

The in-vehicle sensor S2 is a general term for a camera and a microphone which monitor an occupant, a heart rate meter, a clinical thermometer, a vehicle interior temperature sensor, and various sensors which measure an amount of operation of each of an accelerator, a brake, and a steering wheel.

The communication device S3 is a general term for devices which acquire information from the outside of a vehicle. For example, a communication function, such as a wireless LAN, a position information acquisition function, such as GPS, etc. correspond to the communication device S3. Furthermore, as a technique for vehicle-to-vehicle communication or road-to-vehicle communication, communication via an external sensor, such as a camera, a taillight, and a blinker, or communication via high frequency flickering with a signal or a street light, is also one example of the communication device S3.

The electronic control device 1 is a general term for a device which performs arithmetic operation based on signals acquired from an input device (the external sensor S1, the in-vehicle sensor S2, and the communication device S3), and executes control for an output device (the drive device 2 and the in-vehicle notification device 3) based on the result of the arithmetic operation. For example, the electronic control device 1 is an engine control unit (ECU) and a processing device of a navigation system which has map information. The electronic control device 1 realizes functions, such as white line detection and anterior obstacle detection based on information acquired from the external sensor S1, and realizes automatic driving with a combination of the functions. Here, one function is realized by information acquired from at least one or more of the sensors.

The drive device 2 is an actuator which operates based on instruction signals given from the electronic control device 1. For example, the drive device 2 is a throttle actuator, a brake actuator, and a steering actuator.

The in-vehicle notification device 3 is a human machine interface (HMI) which performs notification with regard to traveling. For example, the in-vehicle notification device 3 is a speed meter, an engine speed meter, a speaker, a display, a vibrator, and a light.

The present invention can be realized as software which operates on the electronic control device 1. The electronic control device 1 includes the constituent elements of a basic computer, such as a CPU (operation unit) and a memory (storage unit) which are not illustrated and an input output function of signals for an input device and an output device. These may be realized by a plurality of electronic control devices. Furthermore, these may be realized as a built-in function of an electronic control device, or a part of functions may be realized as a built-in function of an input device or an output device.

Figure 1:
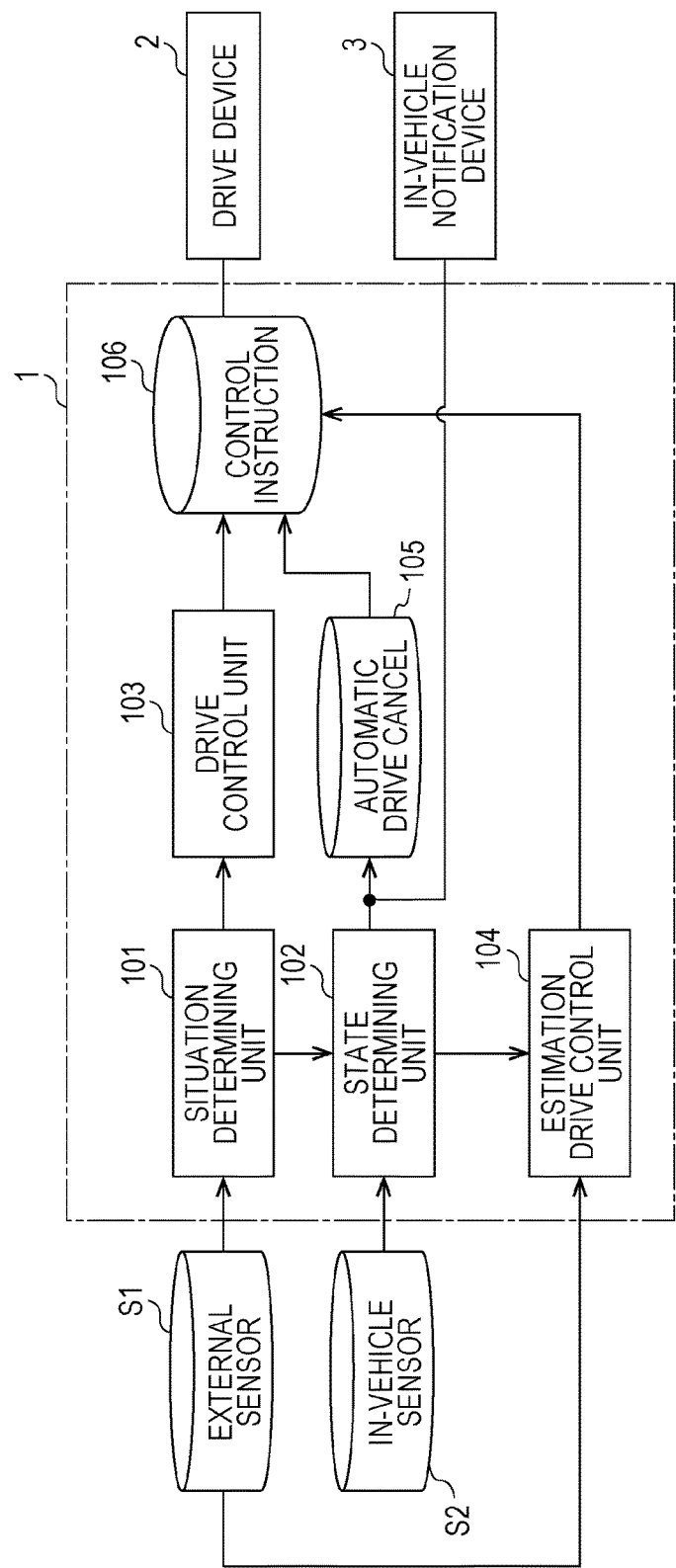
FIG. 1 is a block diagram showing a function of an electronic control device.

FIG. 1 is a block diagram showing the function of the electronic control device 1. The functions of the electronic control device 1 relating to the present invention includes a situation determining unit 101 which makes information from the external sensor S1 as an input, an drive control unit 103 which controls driving in the case where automatic driving is possible according to a determination result of the situation determining unit 101, a state determining unit 102 which makes information from the in-vehicle sensor S2 as an input and determines the state of an occupant in the case where the automatic driving is difficult, and an estimation drive control unit 104 which continues the automatic driving based on the external sensor S1 in the case where the occupant cannot drive immediately.

Memories 105 and 106 each store data temporarily. The memory 105 stores the information determined by the state determining unit 102, and transmits it to the memory 106. The memory 106 stores temporarily the information from the drive control unit 103 and the information from the estimation drive control unit 104 in addition to the information from the memory 105, and sends them to the drive device 2 at the outside of the electronic control device 1. Furthermore, the information determined by the state determining unit 102 is sent to the in-vehicle notification device 3, and is notified towards the occupant by sounds, images, vibration, and so on.

Hereinafter, the function of each unit will be described in detail. First, the situation determining unit 101 determines whether automatic driving is possible based on two or more pieces of sensor information acquired from the external sensor S1. Herein, as the external sensor S1, a compound sensor which includes a front view camera for performing traffic lane keeping and a millimeter wave radar for performing anterior obstacle detection is exemplified. However, sensors to be used for automatic driving should not be restricted to this sensor.

The situation determining unit 101 determines whether automatic driving is possible based on the output of the external sensor S1. Then, in the case where the automatic driving is possible, the drive control unit 103 outputs a normal control instruction based on sensor information. In the case where the automatic driving is difficult, for example, in the case where a white line cannot be detected with a camera due to bad visibility, such as rain, and the traffic lane cannot be kept, in the case where obstacles appear suddenly at a short distance due to falling objects on the road, or in the case where an input cannot be acquired from a sensor due to the sensor breakdown, the situation determining unit 101 notifies the state determining unit 102 of a situation that automatic driving is difficult.

The state determining unit 102 determines whether the occupant can operate, based on the information acquired from the in-vehicle sensor S2. For example, based on state information, such as whether a visual line and a face orientation are viewing the moving direction, whether the state is continuing for a prescribed period of time, whether there is no abnormality in a body temperature and a heart rate, whether operation for an accelerator pedal and a brake pedal is appropriate, and whether the occupant holds a steering wheel, the state determining unit 102 determines whether the occupant can drive.

In the case where automatic driving is difficult and the occupant can drive, the state determining unit 102 cancels the automatic driving, and takes over the driving to the occupant. For example, alert may be transmitted by the in-vehicle notification device 3 so as to make the occupant confirm with a switch provided to a steering wheel a situation that the occupant is required to drive. In the case where it has been determined that it is difficult for the occupant to drive, or in the case where confirmation operation has not been performed for a prescribed period of time, the state determining unit 102 notifies such a state to the estimation drive control unit 104.

In the case where it is difficult for the occupant to drive and it is difficult to perform automatic driving by using the usual function supported by the first external sensor, the estimation drive control unit 104 continues the automatic driving based on signals of the second sensor of the other different kind which is not usually used for realization of the function of automatic traveling.

Figure 3:
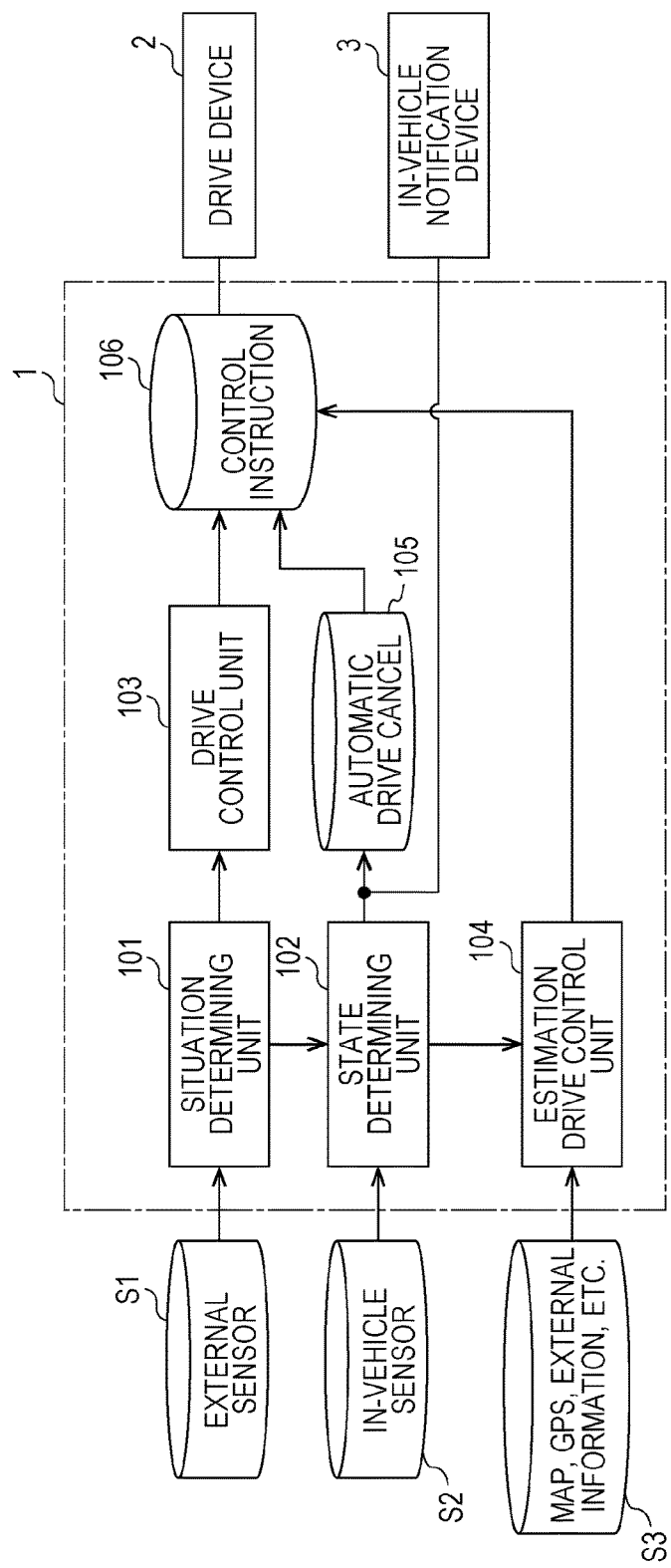
FIG. 3 is a diagram showing a schematic configuration of a general auto driving control system mounted on a vehicle.

FIG. 3 shows the processing in the case where a communication device S3 is added into the configuration shown in FIG. 1. In the example shown in FIG. 2, a description is given to a case where the second sensor is used in place of the first external sensor causing a situation that continuation of the automatic driving is difficult. However, the second sensor does not necessarily need to be an external sensor. If usable, the second sensor may be an in-vehicle sensor, or may be information of the communication device S3. If substitutable information in a broad sense, any one of a sensor and the communication device S3 may be used without problem for distinction of them. The information on the communication device S3 is also categorized as the information on a sensor.

In the case of FIG. 3, the information on the communication device S3 is sent to the estimation drive control unit 104, and is used as signals of the second sensor that is not usually used for realization of the function of automatic traveling. Speaking concretely, by using the other vehicle information obtained from the communication device S3 via vehicle-to-vehicle communication, peripheral information via road-to-vehicle communication, position information via GPS, etc., it becomes possible to output a control instruction with less separation from that at the time of normal automatic driving.

In conclusion, at the time of breakdown of the external sensor S1, a vehicle becomes a situation where a usual automatic drive function supported by this external sensor S1 cannot be attained. However, in the present invention, the automatic drive function can be executed continuously by using the information from a substitute sensor. The substitute sensor may be any one of the external sensor S1, the in-vehicle sensor S2, and the communication device S3, or may be the information acquired by appropriately combining two or more pieces of information from them. Furthermore, at the time of breakdown of the external sensor S1, sensor abnormality is notified through the in-vehicle notification device 3 so as to awaken an occupant and to urge the occupant to switch the driving to manual driving. Accordingly, the driving by the occupant can be realized within a comparatively short time. However, in the present invention, during such a comparatively short time, automatic driving by the substitute sensor is executed continuously, whereby further safe driving is secured.

Hereinafter, a description is given to an original specific external sensor which enables automatic driving and to an example of an automatic drive function performed by this external sensor. Furthermore, thereafter, a description is given to an example of a substitute sensor which enables substitute driving at the time of breakdown of the external sensor.

First, automatic traveling is realized by a combination of several automatic drive functions realized based on signals from the external sensor S1. For example, a lane keeping function for keeping a lane is realized by a white line detection function with a front camera. For example, a brake control function for following traveling and collision avoidance is realized by a distance detection function for an anterior object with a stereoscopic camera and a millimeter wave radar. For example, a lane change function and a right or left turn function are realized with a combination of peripheral obstacle detection with a short distance sensor using infrared light, laser, or ultrasonic wave, map information, destination information, and GPS information.

Various kinds of automatic drive functions for automatic traveling are realized with one or more external sensors. Accordingly, in the case where the functions for automatic traveling are not executed due to fault of the external sensor S1, automatic traveling becomes difficult. Furthermore, the fault of the external sensor S1 is not limited to breakdown, and occurs suddenly due to bad weather, garbage on roads, dirt of a device, and so on.

A scene under automatic driving is classified into three cases of at the time of high speed traveling, at the time of low speed traveling, and at the time of starting or stopping. Then, control required for each of the cases is described in more detail.

Herein, the time of high speed traveling means a case of traveling at a speed lower than a limited speed on a highway, a main trunk road, or a road with a good visibility. The time of low speed traveling means a case of traveling at a low speed or traveling slowly on a busy street being always crowded with people, on a residential street, on a narrow road, at the time of right or left turn at a street intersection, before or after a pedestrian crossing, on a railroad crossing, or at an exit or entrance of an interchange of a highway. The time of starting or stopping means a case of being in the process of stopping in response to a stop instruction such as a signal, a railroad crossing, and temporary stop sign, or due to an anterior pedestrian, or the other obstacle, or a case of being in the process of starting when starting becomes possible due to removal of the stop instruction or the obstacle.

On the other hand, examples of control performed in response to a problem having occurred during automatic driving include speed keeping, traffic lane keeping, moving to a road shoulder, moderate decelerating, and rapid decelerating. These operations are required in the case where decelerating and stopping do not necessarily lead to safety at the time of, for example, traveling at a speed of 100 m/h on a highway, crossing on a railroad crossing, or turning to the right or left.

FIG. 4 shows sensors required for automatic driving and configuration examples of various functions of automatic driving with a combination of these sensors. As examples of the sensors which are mounted on vehicles and used for automatic driving, a simple lens camera, a stereoscopic camera, an infrared camera, an omnidirectional camera, a millimeter wave radar (a submillimeter wave is included), a laser radar, a night vision, an ultrasonic wave, and a rear (back) camera are exemplified in a longitudinal direction in FIG. 4. In the meaning with a broad sense, a map, GPS, and communication information (vehicle-to-vehicle, road-to-vehicle communication, etc.) are also grasped as a sensor.

Furthermore, in a transverse direction in FIG. 4, configuration examples of functions of automatic driving realized with a combination of these sensors are exemplified. For example, the function of a configuration A is realized with a combination of a simple lens camera, a millimeter wave radar (a submillimeter wave is included), a laser radar, and an ultrasonic wave.

In the scene under the above-mentioned driving, control other than the stopping is required at the time of high speed traveling and low speed traveling. Then, hereafter, the control at the time of each of high speed traveling and low speed traveling is described.

Functions, such as detecting a moving direction and peripheral obstacles and keeping a traffic lane, which are functions required for automatic driving, are realized based on the signals from these sensors. Furthermore, as drive support functions other that those, functions, such as a rear camera and a navigation system (a map and GPS) may be mounted. The configurations of the sensors for automatic driving should not be limited to those shown in FIG. 4. Furthermore, since information acquired by a sensor is changed depending on the installation position or angle of the sensor, two or more sensors may be installed. For example, a millimeter wave radar may be installed at each of the front and the rear so as to measure a distance between the vehicle and the other vehicle. Also, two or more laser radars or two or more ultrasonic sensors may be arranged on the outer periphery of the vehicle body so as to detect objects located at a short distance. The configurations of the sensors used for automatic driving should not be limited to those shown in FIG. 4.

FIG. 5 shows the performance of each sensor with a simplification manner. For example, a simple lens camera is good at recognition of an object reflected in a camera. However, the simple lens camera is poor at a measurement of distance, and very bad at night. A millimeter wave radar demonstrates power in detection of a distance, measurement of a distance, operation at night. However, the millimeter wave radar cannot recognize people and a vehicle. Automatic driving is maintained with a combination of these sensor outputs.

Each of the functions required for automatic driving is a combination of sensors which realize it. For example, lane keeping is performed by recognizing boundaries, such as a white line and a curbstone with a simple lens camera, a stereoscopic camera, an omnidirectional camera, and so on. Obstacle detection is performed by measuring a distance to an object located in a moving direction with a stereoscopic camera and a millimeter wave radar. Furthermore, a control instruction for a vehicle body is produced by combining two or more pieces of information from speed sensors and devices which recognizes the moving direction.

In an example shown hereinafter, in the case where it becomes impossible to execute a function required for automatic traveling due to fault of an external sensor which supports a specific function, the estimation drive control unit 104 outputs a control instruction based on the information acquired from the other external sensor, a communication device, or an electronic control unit.

For example, similarly to the configuration A shown in FIG. 4, in a configuration that obstacle detection and object recognition are performed in the forward direction of a vehicle by using a front camera (simple lens camera) and a millimeter wave radar, in the case where lane keeping cannot be performed with a front camera (simple lens camera), it is necessary to separate the control to be performed depending on the time of high speed traveling, the time of low speed traveling, and the time of starting or stopping.

At the time of low speed traveling or at the time of starting or stopping, it is preferable to stop promptly. Furthermore, in the case where a current position according to navigation information etc. is located within a railroad crossing or a street intersection, if it is possible to go straight, it is preferable to pass through the railroad crossing or the street intersection while decelerating. In the case where a vehicle is in the course of turning to the right or left in a street intersection, it is preferable to stop at a road shoulder outside the street intersection while traveling at a slow speed by using position information of GPS and information of a short distance sensor. Even in the case where an external sensor breaks down, the control content to be performed becomes different depending on a driving condition at that time. Accordingly, the above matters mean that it is necessary to select a sensor having a function suitable for executing the control content as a substitute sensor.

When a vehicle travels at a high speed, for example, a white line which the vehicle has already passed through is detected by using an image of a rear camera, and estimation control for keeping the traffic lane is performed based on the position information. In the image of the rear camera, the white line is photographed as a curved line at an end of the image. The traffic lane is kept by using the current moving direction calculated based on an external parameter representing the installation angle of a camera and the orientation of the photographed white line edge. Furthermore, the lane keeping can be performed more stably by using the curve information of the moving direction for control based on a map mounted on the navigation system and the current position with the GPS. Furthermore, the lane keeping can be also performed by following an anterior vehicle with a spot-billed duck traveling manner using a millimeter wave radar. Furthermore, the lane keeping using an around view image used for automatic parking etc. is also possible.

As mentioned above, with regard to defect of the function at the time of low speed traveling or at the time of starting or stopping, stopping can be performed safely by not performing quick braking. Then, in the following example, the time of high speed traveling is described.

For example, in the case where an anterior obstacle detection cannot be performed with a millimeter wave radar, a distance between the vehicle and an anterior vehicle is estimated based on the license plate of the anterior vehicle reflected in a front camera, and the traveling can be continued. Furthermore, in the case where mutual position information can be acquired via vehicle-to-vehicle communication, a distance between the vehicle and an anterior vehicle can be acquired by using the position information of GPS. Furthermore, in the case where mutual sensor information can be shared via vehicle-to-vehicle communication, an obstacle for the vehicle can be detected by using the information of a backward distance sensor of an anterior vehicle. That is, the vehicle is located at the back of an immediately-preceding vehicle, and the sensitivity of the distance sensor does not change rapidly. Accordingly, in the case where the front of the rear sensor of the anterior vehicle is interrupted with the vehicle, it is considered that an obstacle appears. Even in the case where one eye of a stereoscopic camera breaks down, such control is effective.

Furthermore, for example, in the case where a peripheral obstacle cannot be detected with a short distance sensor, the position of a neighboring vehicle is estimated based on the past information acquired from a front camera, a millimeter wave radar, etc., and the traveling can be kept. Furthermore, if vehicle-to-vehicle communication is possible, when a vehicle exists near the vehicle, the vehicle can stop safely on a road shoulder by sharing the position information and sensor information.

Furthermore, for example, in the case where a guardrail or a curbstone cannot be detected with a short distance sensor, the current position of the guardrail or the curbstone can be estimated from an image reflected in a front camera. For example, since the guardrail and the curbstone are located in almost parallel to a medial division line, the current position of them can be estimated from the position of the medial division line and a road width. Furthermore, the position of the guardrail or the curbstone can be also acquired by using an image used for an around view.

Furthermore, it may be considered that in some of the processing mentioned as examples, processing capability is insufficient for real-time processing required for automatic driving. In such a case, by dropping a sampling rate, time until a driver takes over the driving can be gained.

Furthermore, without depending on the breakdown situation of a device, the following estimation control may be considered. The above general effects in the case of using a special sensor may not be expected for the following estimation control. However, in the case of performing traffic lane keeping, completing right or left turn, or stopping safely, and in the case where a sensor to be originally used has fault, the following estimation control is effective.

Examples of the above case include traffic lane changing or stopping to a road shoulder by using a short-distance infrared sensor, an around view image, and a navigation system at the time of low speed traveling. That is, a current traveling traffic lane is estimated by using position information and map information, and a final stopping position is determined by using the short-distance infrared sensor and the around view image.

For example, with the control based on a combination of an image of the other vehicle acquired via vehicle-to-vehicle communication with an anterior vehicle, GPS information, and map information, from the position of the other vehicle and the observation for the vehicle, it becomes possible to change the traffic lane and to keep the traveling.

For example, in the case where decelerating is wanted due to fault of an external sensor at the time of high speed traveling, a degree of the decelerating can be estimated based on an image of a succeeding vehicle reflected in a rear camera. In the case where a following vehicle does not exist in a short distance, the decelerating is performed quickly. On the other hand, in the case where a following vehicle exists in a short distance, the decelerating is performed slowly. A distance between the vehicle and a following vehicle can be estimated from the size of an object with a fixed length, such as a license plate, on an image. Furthermore, the distance can be also determined based on the size of a non-road surface part on a region which becomes a road surface on an image. As there are many non-road surface parts, it may be considered that a traveling vehicle exists in a short distance.

The estimation drive control unit 104 shown in FIGS. 1 and 3 realizes estimation drive control on the assumption that a vehicle executing automatic driving is in a traveling state and subject to a situation that the vehicle has performed automatic traveling safely immediately before. That is, control so as to start traveling from a stopping state is not assumed. However, in the case where control, such as avoiding an emergency vehicle is required regardless of insufficiency of information from an external sensor, moving to a road shoulder or traffic lane changing can be realized based on a situation of the circumference acquired by a short-distance infrared sensor, an around view image, map information, and GPS information, or via vehicle-to-vehicle communication or road-to-vehicle communication.

During a period when the estimation drive control unit 104 is outputting a control instruction and the drive device is keeping the traveling, awakening may be performed so as to urge an occupant to become a state capable of driving, with an alert by a speaker of an in-vehicle notification device, or warning by vibration, or light. At this time, until it is determined that a driver becomes able to take over the driving, the state determining unit 102 executes repeatedly state determination for the driver.

In the case where the estimation drive control unit 104 is outputting a control instruction, it may be considered to transmit warning towards the outside of a vehicle. For example, an action different from usual, such as a blinker, a klaxon horn, and a brake lamp, may be considered. Examples of the action different from usual include flickering a blinker and a brake lamp alternately, lighting a blinker at all times, and sounding a klaxon horn little by little. Furthermore, it may be considered that a situation that fault has arisen is notified through a communication device to peripheral vehicles and a management center of an automatic traveling vehicle.

With regard to notification of a vehicle with fault, for example, it may be considered to notify a function with the fault having occurred, a position before the fault has occurred, a current position, and various kinds of external sensor information immediately before the fault has occurred, to the management center.

Furthermore, it may be considered to receive based on the notification an offer of information on a place enabling the vehicle to stop safely from the management center, and to perform automatic traveling toward the place. Furthermore, it may be also considered that the management center issues an instruction to make the vehicle execute automatic traveling, based on the information on the external sensor of a vehicle having notified, information on the other peripheral vehicles, and information on the road sensors.

The map of the navigation system incorporated in the electronic control device has route information, such as limiting speeds on a road, a road width, the number of traffic lanes, the kind, color, and texture of a road surface, an existence or non-existence of a median divider, an existence or non-existence of a foot walk, and a position of each of a manhole and a remained side of construction. Accordingly, the route information may be used to realize various functions. Furthermore, the route information may be provided to vehicles via communication from the above-mentioned management center.

What is claimed is:

1. An auto driving control system for realizing automatic traveling of a vehicle with a combination of a plurality of functions, each of which uses information from
    at least one of a plurality of sensors mounted on the vehicle, the auto driving control system comprising:
        a situation determining unit which recognizes a situation around the vehicle during traveling by using an external sensor to detect a situation outside the vehicle among the sensors and determines whether automatic traveling is possible;
        a drive control unit which performs traveling control for the vehicle in a case where the automatic traveling is possible;
        a state determining unit which determines whether an occupant is able to drive, based on a state of the occupant by using an in-vehicle sensor to detect a situation inside the vehicle among the sensors;
        an estimation drive control unit configured such that in a case where the automatic traveling is difficult and it is difficult for the occupant to take over the driving, and in a case where it is determined that execution of a function of the automatic traveling is difficult due to a first sensor to supply information to the function, the estimation drive control unit executes the function in a substitution manner by using information of a second sensor other than the first sensor, and performs traveling control of the vehicle,
    wherein the automatic traveling is continued based on a control instruction of the estimation drive control unit until the occupant becomes able to take over the driving; and
    an in-vehicle notification device which issues a warning for the occupant,
    wherein while the automatic traveling is performed based on the control instruction, the state determining unit continuously determines whether the occupant is able to drive, and the in-vehicle notification device issues a warning for the occupant until the occupant becomes able to drive.

2. The auto driving control system according to claim 1, wherein the vehicle acquires information via a communication device, and uses the information acquired via the communication device as the information of the second sensor.

3. The auto driving control system according to claim 1, wherein a control content is changed in accordance with a driving state of the vehicle, and traveling control for the vehicle is performed by changing and selecting the second sensor for each control content.

4. The auto driving control system according to claim 1, wherein the estimation drive control unit performs control by using information held by the vehicle, such as
    information from each of an external sensor, a rear camera, an around view camera, and a short-distance infrared sensor, a map, GPS positional information, speed, and acceleration.

5. The auto driving control system according to claim 1, wherein the estimation drive control unit performs control by combining information acquired via vehicle-to-vehicle communication or information acquired via road-to-vehicle communication with information held by the vehicle.

6. The auto driving control system according to claim 5, wherein examples of the information acquired via the vehicle-to-vehicle communication and the road-to-vehicle communication include an image around the vehicle photographed by another vehicle, a congesting situation on a road, a situation on a road surface, a position of each of the vehicle and the other vehicle, the speed and acceleration of a vehicle performing the vehicle-to-vehicle communication, a position of next right or left turn of the vehicle performing the vehicle-to-vehicle communication,
    presence/absence of automatic traveling of the other vehicle, and a position of right or left turn of the other vehicle around.

7. An auto driving control method for realizing automatic traveling of a vehicle with a combination of a plurality of functions, each of which uses information from
    at least one of a plurality of sensors mounted on the vehicle, the auto driving control method comprising:
        determining whether automatic traveling is possible, by recognizing a situation around the vehicle during traveling by using an external sensor to detect a situation outside the vehicle among the sensors;
        performing traveling control for the vehicle in a case where the automatic traveling is possible;

determining whether an occupant is able to drive, based on a state of the occupant by using an in-vehicle sensor to detect a situation inside the vehicle among the sensors;

in a case where the automatic traveling is difficult and it is difficult for the occupant to take over the driving, and in a case where it is determined that execution of a function of the automatic traveling is difficult due to a first sensor to supply information to the function, performing traveling control for the vehicle by executing the function in a substitution manner by using information of a second sensor other than the first sensor;

continuing the automatic traveling based on an instruction of traveling control for the vehicle until the occupant becomes able to take over the driving;

issuing a warning for the occupant; and determining whether the occupant is able to drive, while performing the automatic traveling based on the instruction of traveling control, and issuing the warning until the occupant becomes able to drive.

8. An auto driving control method for realizing automatic traveling of a vehicle with a combination of a plurality of functions, each of which uses information from at least one of a plurality of sensors disposed inside and outside the vehicle, the auto driving control method comprising:

performing automatic traveling by using an external sensor to detect a situation outside the vehicle;

determining whether an occupant is able to drive, by using an in-vehicle sensor to detect a situation inside the vehicle; and in a case where the automatic traveling is difficult and it is difficult for the occupant to take over the driving, performing traveling control for the vehicle with a substitution function by using information of a second sensor in place of a first sensor being a cause of making the automatic traveling difficult;

continuing traveling control for the vehicle with the substituent function until the occupant becomes able to take over the driving;

issuing a warning for the occupant; and determining whether the occupant is able to drive, while performing the automatic traveling based on traveling control, and issuing the warning until the occupant becomes able to drive.

9. The auto driving control method according to claim 8, wherein in a case of performing anterior obstacle detection with a millimeter wave radar as the first sensor at the time of high speed traveling, a front camera is used as the second sensor due to the abnormality, a distance between the vehicle and an anterior vehicle is estimated based on a license plate of the anterior vehicle reflected In the second sensor, and the driving is continued.

10. The auto driving control method according to claim 8, wherein in a case of performing detection of a distance between the vehicle and another vehicle with a millimeter wave radar as the first sensor at the time of high speed traveling, a GPS is used as the second sensor due to the abnormality, a distance between the vehicle and the other vehicle is estimated based on a position information of the GPS, and the driving is continued.

11. The auto driving control method according to claim 8, wherein in a case of performing obstacle detection with a millimeter wave radar as the first sensor at the time of high speed traveling, when mutual sensor information is able to be shared via vehicle-to-vehicle communication as the second sensor due to the abnormality, an obstacle for the vehicle is detected by using a backward distance sensor of an anterior vehicle, and the driving is continued.

12. The auto driving control method according to claim 8, wherein in a case of performing peripheral obstacle detection with a short distance sensor as the first sensor at the time of high speed traveling, a front camera and a millimeter wave radar are used as the second sensor due to the abnormality, a position of a neighboring vehicle is estimated based on past information of the camera and the radar, and the driving is continued.

13. The auto driving control method according to claim 8, wherein in a case of performing peripheral obstacle detection with a short distance sensor as the first sensor at the time of high speed traveling, when vehicle to vehicle communication is able to be used as the second sensor due to the abnormality and another vehicle exists near the vehicle, the vehicle is stopped safely at a road shoulder by sharing the position information and sensor information.

14. The auto driving control method according to claim 8, wherein in a case of performing detection of a guardrail or a curbstone with a short distance sensor as the first sensor at the time of high speed traveling, a position of the guardrail or the curbstone is acquired by utilizing an image used for an around view as the second sensor due to the abnormality.

15. The auto driving control method according to claim 8, wherein a short-distance infrared sensor, an around view image, and a navigation system are used as the second sensor at the time of low speed traveling, a current traveling traffic lane is estimated by using position information and map information of the navigation system, and a final stopping position is determined by using the short-distance infrared sensor and the around view image.

16. The auto driving control method according to claim 8, wherein with control based on a combination of an image of another anterior vehicle acquired via vehicle-to-vehicle communication with the anterior vehicle as the second sensor, GPS information, and map information, traffic lane changing or traveling keeping is performed based on a position of the other vehicle and observation for the vehicle.

17. The auto driving control method according to claim 8, wherein in a case where decelerating is wanted to be performed due to fault of the first sensor at the time of high speed traveling, the degree of the decelerating is estimated based on an image of a following vehicle reflected in a rear camera as the second sensor.

* * * * *